US006218039B1

(12) United States Patent
Mease et al.

(10) Patent No.: US 6,218,039 B1
(45) Date of Patent: Apr. 17, 2001

(54) CLAMPING APPARATUS AND METHOD FOR A FUEL CELL

(75) Inventors: Kevin L. Mease, Latham; Adam K. Brunner, Castleton; Larry A. Pitts, Averill Park; Alan F. Winslow, Ballston Spa, all of NY (US)

(73) Assignee: Plug Power, Inc., Latham, NY (US)

( * ) Notice: Subject to any disclaimer, the term of this patent is extended or adjusted under 35 U.S.C. 154(b) by 0 days.

(21) Appl. No.: 09/382,350

(22) Filed: Aug. 25, 1999

(51) Int. Cl.[7] .............................. H01M 2/00; H01M 6/00
(52) U.S. Cl. ................. 429/37; 429/12; 429/34; 429/35; 429/66; 29/623.2
(58) Field of Search .................... 429/34, 35, 37, 429/66, 12; 29/623.2

(56) References Cited

U.S. PATENT DOCUMENTS

| 4,689,280 | 8/1987 | Gionfriddo . |
| 4,719,157 | 1/1988 | Tsutsumi et al. . |
| 4,973,531 | 11/1990 | Zaima et al. . |
| 4,997,728 | 3/1991 | Onoda et al . |
| 5,009,968 | 4/1991 | Guthrie et al. . |
| 5,419,980 | 5/1995 | Okamoto et al. . |
| 5,441,825 | 8/1995 | Barlow . |
| 5,484,666 | 1/1996 | Gibb et al. . |
| 5,534,362 | 7/1996 | Okamoto et al. . |
| 5,547,777 | 8/1996 | Richards . |
| 5,607,786 | 3/1997 | Guthrie et al. . |
| 5,736,269 | 4/1998 | Okamoto et al. . |
| 5,789,091 | 8/1998 | Wozniczka etal. . |

FOREIGN PATENT DOCUMENTS

| 1 358 243 | 7/1974 | (DE) . |
| 63108678 | 5/1988 | (EP) . |
| 58-53166 | 3/1983 | (JP) . |
| WO 99/27602 | 6/1999 | (WO) . |

Primary Examiner—Stephen Kalafut
Assistant Examiner—Angela J. Martin
(74) Attorney, Agent, or Firm—Trop, Pruner & Hu, P.C.

(57) ABSTRACT

A fuel cell assembly includes a stack assembly having fuel cell plates and a frame having a bottom section and at least two side sections integrally formed with the bottom section. The stack assembly is placed on the frame bottom section, and one or more fasteners are used to attach the frame to an upper portion of the stack assembly to apply a compressive force on the stack assembly.

22 Claims, 4 Drawing Sheets

CLAMPING APPARATUS AND METHOD FOR A FUEL CELL

BACKGROUND

The invention relates to clamping apparatus and methods for fuel cells.

Fuel cells have been used to produce electrical power. A fuel cell is an electrochemical device that converts energy produced by a chemical reaction into electrical energy. Fuel cells generally employ an ion exchange membrane or solid polymer electrolyte disposed between two electrodes that form the anode and cathode. One type of fuel cell includes a proton exchange membrane (PEM) fuel cell. At the anode of the PEM fuel cell, diatomic hydrogen (a fuel) is oxidized to produce hydrogen protons that pass through the membrane. The electrons produced by this oxidation travel through electrical circuitry that is external to the fuel cell to form an electrical current. At the cathode, oxygen is reduced and reacts with the hydrogen protons to form water.

Multiple fuel cells can be connected together, generally in series, to increase the voltage output of the fuel cell assembly. Several serially connected fuel cells may be formed in an arrangement called a fuel cell stack. The fuel cell stack may include different plates that are stacked one on top of the other in the appropriate order, and each plate may be associated with more than one fuel cell of the stack. The plates may be formed of metal or a graphite composite material and may include various channels and orifices to route the above-described reactants and products through the fuel cell stack. Several PEMs (each one being associated with a particular fuel cell) may be dispersed throughout the stack between the anodes and cathodes of the different fuel cells.

Referring to FIG. 1, as an example, a fuel cell stack 10 may be formed out of repeating units called plate modules 12. Each plate module 12 includes a set of composite plates that may form several fuel cells. For the arrangement depicted in FIG. 1, an exemplary plate module 12a may include a cathode cooler plate 14, a bipolar plate 16, a cathode cooler plate 18, an anode cooler plate 20, a bipolar plate 22 and an anode cooler plate 24 that are stacked from bottom to top in the listed order. Each cooler plate acts as a heat exchanger by routing a coolant through flow channels in either the upper or lower surface of the cooler plate to remove heat from the plate module 12a. The other surface of each cooler plate includes flow channels to route either hydrogen (for the anode cooler plates 20 and 24) or oxygen (for the cathode cooler plates 14 and 28) to an associated fuel cell. The bipolar plates 16 and 22 include flow channels on one surface (top or bottom surface) to route hydrogen to an associated fuel cell and flow channels on the opposing surface to route oxygen to another associated fuel cell. In this arrangement, each fuel cell may be formed in part from one bipolar plate and one cooler plate, as an example. Other fuel cell stacks have other arrangements.

To achieve optimal fuel cell performance, the components of a stack, such as the stack 10, are assembled and operated under a load or compressive force, which is also referred to as a clamping force, that is applied using a vertical press. The applied clamping force is used to compress gaskets for sealing the mating surfaces between adjacent plates to prevent leakage of the different gases and liquids in the fuel stack. In addition, the applied clamping force is used to provide a consistent pressure across the area of gas diffusion layers (GDLs) to achieve sufficient electrical conductivity between the GDLs and corresponding lands of the fuel cell plates in a stack. As illustrated in FIG. 1, one technique of applying the compressive force is by use of tie rods 24 attaching top and bottom end plates 20 and 22. The number of tie rods used may range from four to twelve. The tie rods 24 may be attached to the end plates 20 and 22 by use of washers and nuts. Typically, the end plates 20 and 22 are relatively thick and are formed of stainless steel or some other metal to provide structural support under the applied clamping force provided by the tie rods 24. However, the use of heavy stainless steel end plates and numerous tie rods, washers, and nuts lead to a relatively heavy assembly. Further, connecting the tie rods 24 to the end plates 20 and 22 to form the fuel cell assembly involves a relatively large number of steps, which may be time consuming.

Other techniques for applying a compressive force onto a fuel cell stack also exist. One such technique uses compression bands that extend around the end plates of the fuel stack assembly. However, these and other conventional clamping mechanisms are also associated with shortcomings. A need thus continues to exist for an improved apparatus and method for clamping fuel cell stack assemblies.

SUMMARY

In general, according to one embodiment, a fuel cell assembly includes a stack assembly having fuel cell plates. The fuel cell assembly further includes a frame having a bottom section and at least two side sections integrally formed with the bottom section. The stack assembly is placed on the frame bottom section, and one or more fasteners are used to attach the frame to an upper portion of the stack assembly to apply a compressive force on the stack assembly.

Other features of the invention will become apparent from the following description, from the drawing, and from the claims.

BRIEF DESCRIPTION OF THE DRAWINGS

FIGS. 5–8 illustrate different embodiments of fastening mechanism to attach clamping devices to the fuel cell stack of FIG. 2.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
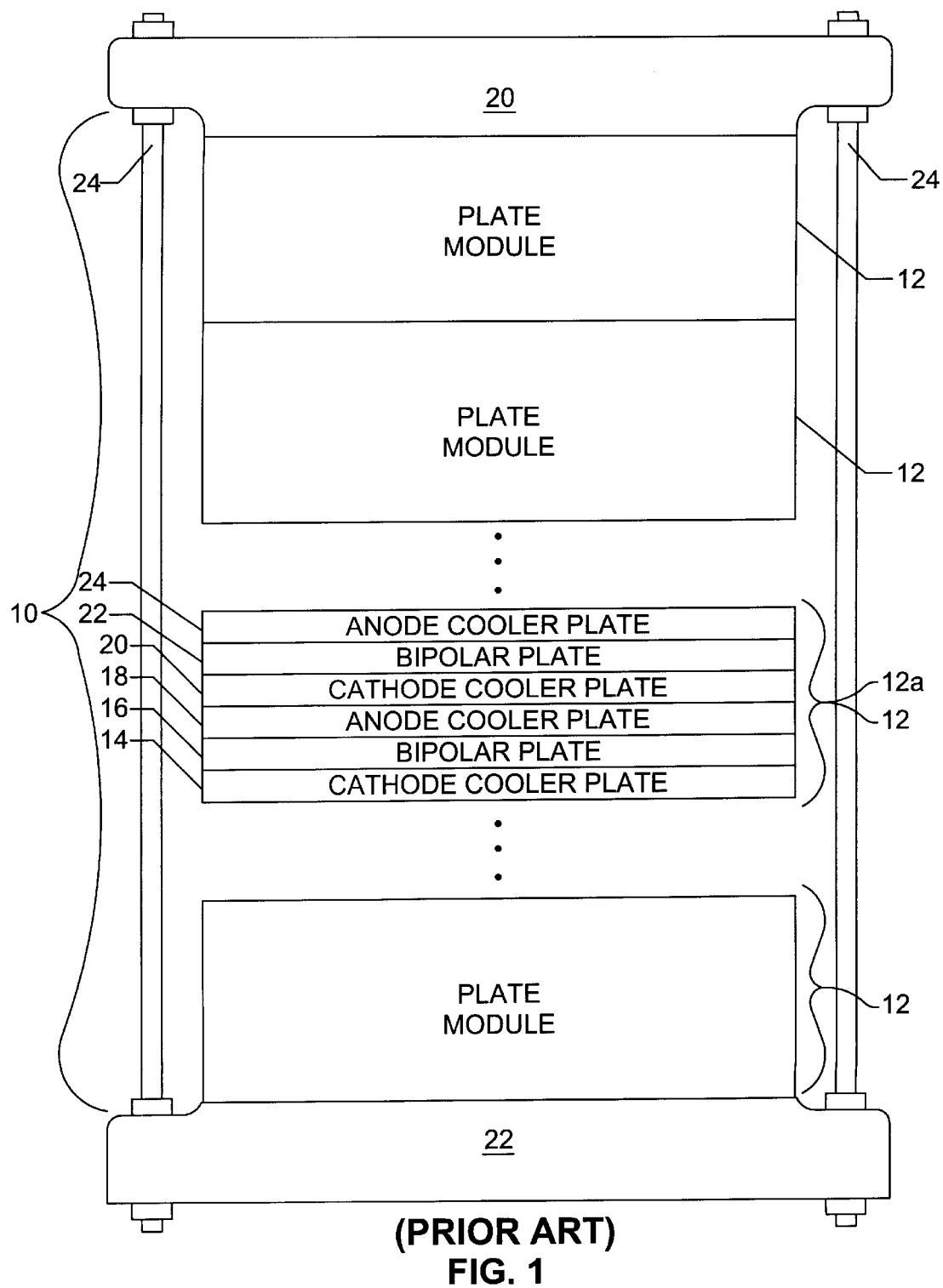
FIG. 1 illustrates a fuel cell assembly including a conventional clamping device.
Figure 2:
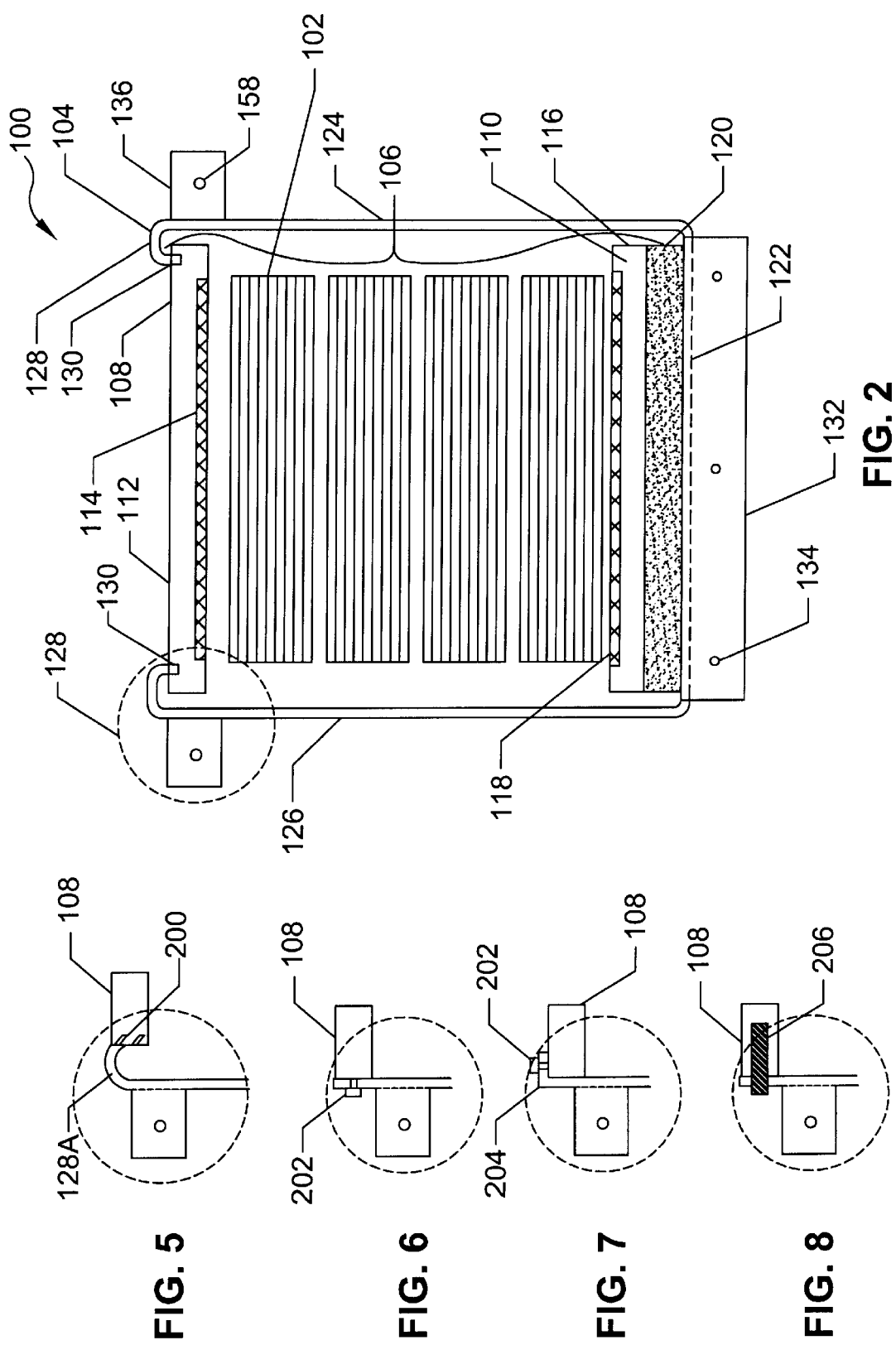
FIG. 2 illustrates a fuel cell assembly including a clamping device in accordance with one embodiment of the invention to apply a compressive force on a stack of fuel cells.

Referring to FIG. 2, a fuel cell assembly 100 includes a stack assembly 106 (including multiple fuel cells) and a frame 104 in which the stack assembly 106 is mounted. In one embodiment, the stack assembly 106 includes a plurality of plate modules 102 each having a plurality of plates, including bipolar plates, cathode cooler plates, and anode cooler plates. The stack assembly 106 may further include a top end plate 108 and a bottom end plate 110. For purposes of illustration, the layers of the stack assembly are shown separated from each other.

The top end plate 108 includes a first insulating portion 112 and a second electrically conductive portion 114 that provides a current collector plate for the fuel cell stack 106. Similarly, the bottom end plate 110 includes a first insulating portion 116 and a second electrically conductive portion 118 that provides the bottom current collector plate. Further, the stack assembly 106 includes a compliance layer 120 to allow for stack expansion or contraction. The compliance layer 120 can be formed of rubber or other suitable material.

Figure 4:
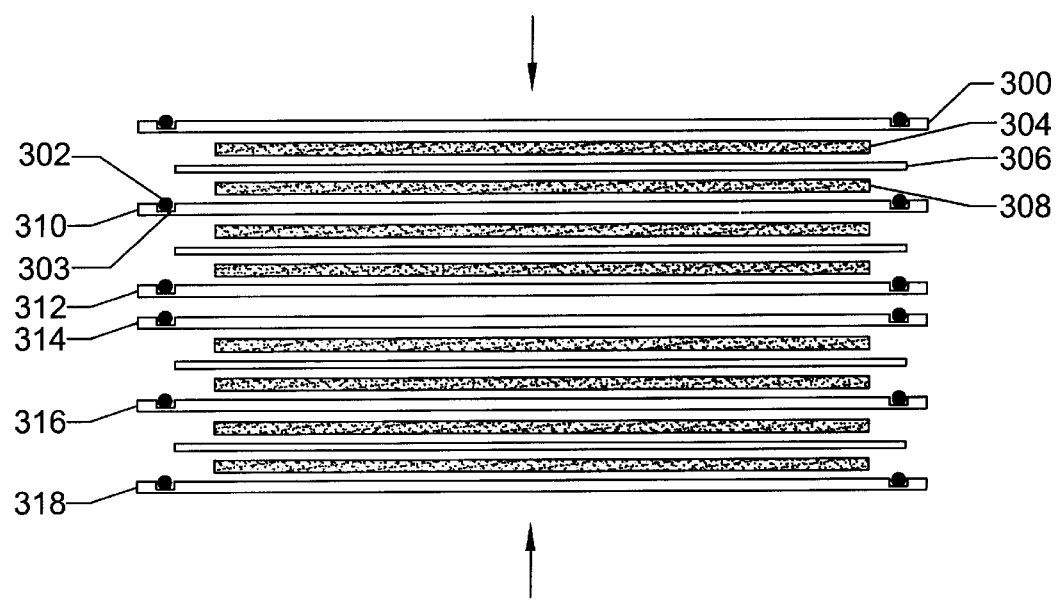
FIG. 4 illustrates layers in a portion of the fuel cell assembly of FIG. 2.

Referring to FIG. 4, a portion of a plate module 102 in accordance with one embodiment is illustrated. The illustrated portion includes an anode cooler plate 300, a bipolar plate 310, a cathode cooler plate 312, a second anode cooler plate 314, a second bipolar plate 316, and a second cathode cooler plate 318. To provide seals for the gases and liquids (e.g., hydrogen, oxygen, and a liquid coolant) that are flowing through the fuel cell stack, gaskets 302 are provided between adjacent plates. Thus, a gasket 302, which may be an O-ring seal, is seated in a groove 303 formed in an upper surface of the bipolar plate 310. A similar sealing arrangement is provided for the other plates 300, 312, 314, 316, and 318. In addition, between adjacent plates are various layers, including a proton exchange membrane (PEM) layer 306 (such as a Nafion™ membrane or other suitable membrane as known in the art), gas diffusion layers 304 and 308 (which may be formed of carbon paper or cloth or other electrically conductive materials as known in the art), and catalyst and electrode layers as known in the art. The gas diffusion layers 304 and 308 are electrically conductive layers adapted to be electrically contacted to portions of the anode cooler, bipolar, or cathode cooler plates. To ensure optimal performance of the gaskets 302 as well as the gas diffusion layers 304 and 308, a compressive force applied generally in a longitudinal direction as indicated by the arrows in FIG. 4, are applied on the fuel cell stack.

In accordance with one embodiment, such a compressive force is applied by a clamping device that includes the frame 104, which is designed to hold the stack assembly 106 and to clamp onto an upper portion of the stack assembly 106 to apply the compressive force. As used here, a compressive force applied may be due to force applied by the frame 104, compressive force already present in the stack assembly 106 from an external source such as a mechanical or hydraulic press, or a combination of both. In one embodiment, frame side sections 124 and 126 are moved outwardly to allow the uncompressed stack assembly 106, which may be several inches longer than side sections 124 and 126 and adjoining fasteners 128, to be placed in the frame 104. The stack assembly 106 is then compressed by a vertical press apparatus (mechanical or hydraulic) prior to mounting in the frame 104. For example, a stack of 88 fuel cells may have a non-compressed height of about 24 inches. After application of about 10,000 pounds of force by a vertical press, the height of the stack may be reduced down to about 21 inches. The side sections 124 and 126 are then moved inwardly to allow fasteners 128 to engage the top endplate 108. The force of the press apparatus is then removed and the frame 104 serves to maintain all or some substantial part of the compression of the stack assembly 106.

In one embodiment, the side sections 124 and 126 may be resiliently secured to the bottom section 122. For example, side sections 124 and 126 may be formed of a resilient material such as a metal with spring qualities. In another embodiment, a resilient joint (not shown) may be provided between bottom section 122 and each of side sections 124 and 126. Thus, in some possible embodiments, the side sections 124 and 126 may be pulled outwardly, in other words they may be sprung outwardly, to allow the fuel cell stack in an uncompressed state to be placed in the frame. The frame may then be compressed by a press. The side sections 124 and 126 may then be released to allow the frame to engage the fuel cell stack in a compressed state, so that when the compression from the press is removed, the frame 104 will maintain the fuel cell stack 106 in a compressed state, including all or a portion of the compression supplied by the press. In such an embodiment, side sections 124 and 126 may be described as being resiliently biased in a closed position.

In another possible embodiment, the frame 104 may be provided with side sections 124 and 126 that are resiliently biased in an open position. In such an embodiment, the side sections 124 and 126 would be pushed or sprung into a closed position around the stack 106, and then the compressive force from the press would be removed to allow the fasteners 128 to engage the stack 106. Providing a frame 104 with side sections 124 and 126 in an open position may have the advantage of removing a step from the assembly process, because the side sections 124 an 126 need not be opened to receive the uncompressed stack 106, but instead need only be closed around the stack 106 once it is compressed. In other possible embodiments, the side sections 124 and 126 may be formed of a material such as a metal that does not have significant spring qualities, but that instead must be simply bent to accommodate the methods and configurations described above.

Figure 3:
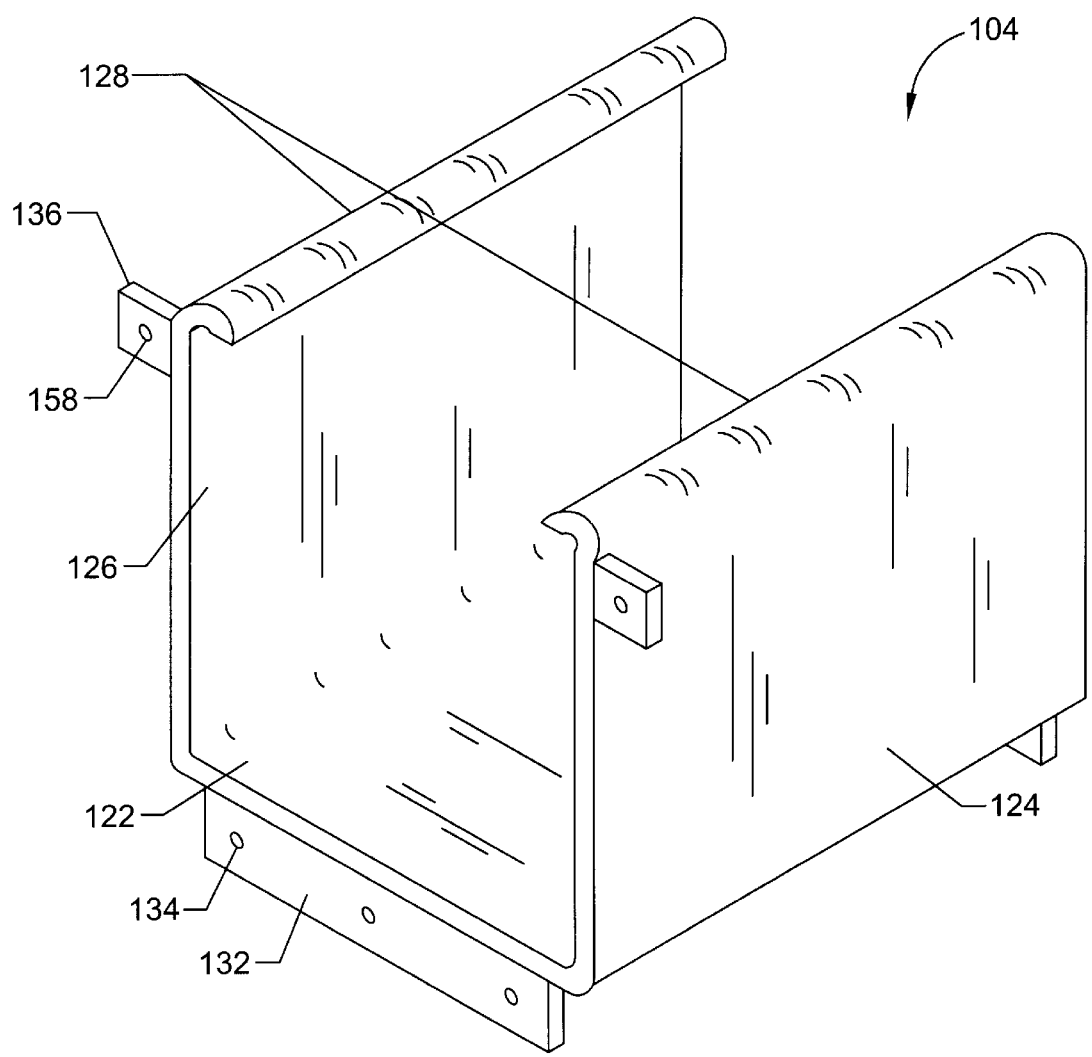
FIG. 3 is a perspective view of the clamping device of FIG. 1.

The frame 104 that houses the stack assembly 106 in one embodiment may be formed of a sheet metal (or other material providing sufficient structural rigidity and strength) that is formed to be generally U-shaped. Referring further to FIG. 3, the frame 104 includes a bottom section 122 and two side sections 124 and 126. The bottom and side sections provide the load bearing portions of the frame 104. In further embodiments, additional sections may extend from the bottom section 122. In the embodiment illustrated in FIG. 3, the front and back portions of the frame 104 are left uncovered, as is the top portion of the frame 104. Convenient mounting of fuel cell components through the uncovered portions is provided in the illustrated embodiment. However, in further embodiments, the frame 104 may include additional sections to cover such portions. In yet other arrangements, instead of the side sections or bottom sections being formed of a single piece, one or all of the sections may each be divided into multiple segments.

The sections 122, 124 and 126 in FIG. 3 are formed from a single sheet of material. Consequently, the side sections 124 and 126 are integrally attached to the bottom section 122. Fasteners 128 are attached to the upper portions of the side sections 124 and 126. In the illustrated embodiment, the fasteners 128 are formed from the same sheet of material as the rest of the frame 104 and thus may be integrally attached to the upper portions of the side sections 124 and 126. As shown in FIG. 2, the fasteners 128 are bent portions forming hooks that are engageable in corresponding grooves 130 formed on the upper surface of the top end plate 108. In one embodiment, the fasteners 128 may be made to have sufficient resiliency such that a predetermined compression force is applied on the stack.

Once the frame 104 is attached to the stack assembly 106, the frame 104 and fasteners 128 form part of a clamping device to apply a compressive or clamping force on the stack assembly 106. The frame 104 according to the illustrated embodiment allows relatively quick and easy attachment to a fuel cell stack assembly. Further, the clamping device can be formed of a relatively light material, which in one embodiment is a sheet metal or other material. Using the clamping device in accordance with some embodiments, assembly is simplified and a more light weight fuel cell assembly can be provided.

As shown in FIG. 3, the frame 104 may also include mounting pieces 132 that are attached to the bottom section 122 of the frame 104. The mounting pieces 132 may be fold-down flaps that are integrally formed with the rest of the frame 104. The fold-down flaps 132 provide structural stiffness and rigidity to the frame 104. In one embodiment, openings 134 may be provided in the fold-down flaps 132 to allow the frame 104 to be mounted to a mounting bracket (not shown) of a fuel cell system. The frame 104 also includes side flaps 136 each including an opening to mount to corresponding structures in the overall fuel cell system.

Referring to FIGS. 5–8, alternative embodiments of fasteners are illustrated. In FIG. 5, grooves may be formed on the sides of the top end plate 108 instead of on its top surface. An integral fastener 128A (that is integrally attached to the frame side section 124 or 126) in this embodiment is mounted into side grooves 200 formed in the top end plate 108.

FIGS. 6 and 7 illustrate embodiments in which a conventional fastener, such as a screw, may be used to attach the side sections 124 and 126 to the top end plate 108. In FIG. 4, a set screw 202 is provided through an opening in a side section (124 or 126) of the frame 104 into a threaded opening on a side of the top end plate 108. It will be appreciated that other types of screws may also be used in place of set screw 202. In FIG. 7, the side section (124 or 126) includes a top bent portion 204 having an opening through which the set screw 202 may be mounted. In this embodiment, threaded openings are provided in the top surface of the top end plate 108 to receive the set screw 202.

In another embodiment, as shown in FIG. 8, a locking pin 206 is used to attach the side section (124 or 126) to the top end plate 108. In other embodiments, other types of fasteners may be employed. For example, the locking pin 206 may include wedges, keys, dowels, or other like structures.

Some embodiments of the invention may include one or more of the following advantages. A relatively low-cost clamping device is provided for applying a clamping force onto a fuel cell stack. By reducing the number of parts and complexity of attachment mechanisms, relatively quick and convenient assembly of the clamping device to the fuel cell stack is enabled. This reduces the time involved in assembling a fuel cell system, thus making the clamping device suitable for high-volume manufacturing of fuel cell assemblies. By using a clamping device that is relatively light weight, handling during manufacturing and shipping is also made convenient.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell assembly, comprising:
   a stack assembly including fuel cell plates;
   a frame having a bottom section and at least two side sections integrally formed with the bottom section, the stack assembly being placed on the frame bottom section; and
   one or more fasteners to attach the frame to an upper portion of the stack assembly to apply a compressive force on the stack assembly.

2. The fuel cell assembly of claim 1, wherein the one or more fasteners are integrally formed with at least one of the frame side sections.

3. The fuel cell assembly of claim 2, wherein the upper portion of the stack assembly includes a structure adapted to engage the one or more fasteners.

4. The fuel cell assembly of claim 1, wherein the one or more fasteners are separate from the frame side sections.

5. The fuel cell assembly of claim 4, wherein the one or more fasteners include one or more screws.

6. The fuel cell assembly of claim 4, wherein the one or more fasteners include a locking key.

7. The fuel cell assembly of claim 1, further comprising at least one mounting piece attached to the frame bottom section adapted to mount the fuel cell assembly to another structure.

8. The fuel cell assembly of claim 7, wherein the at least one mounting piece includes at least one flap folded down and integrally attached to the frame bottom section.

9. The fuel cell assembly of claim 1, further comprising side flaps attached to the side sections adapted to mount the fuel cell assembly to another structure.

10. The fuel cell assembly of claim 1, wherein the frame is formed from a sheet metal.

11. A method of making a fuel cell assembly, comprising:
    forming a stack of fuel cells;
    mounting the stack of fuel cells in a frame, the frame having a bottom section and at least two side sections integrally formed with the bottom section; and
    fastening upper portions of the side sections to an upper portion of the fuel cell stack to apply a clamping force on the fuel cell stack.

12. The method of claim 11, further comprising outwardly extending the frame side sections to accommodate the fuel cell stack in an uncompressed state, applying compression from a press to the fuel cell stack, inwardly extending the frame side sections to engage the fuel cell stack in a compressed state, removing the compression from the press, and using the frame to maintain the fuel cell stack in a compressed state.

13. The method of claim 11, wherein the side sections are resiliently secured to the bottom section in a biased closed position, further comprising pulling the frame side sections outwardly to allow the fuel cell stack in an uncompressed state to be placed in the frame, applying compression from a press to the fuel cell stack, releasing the frame side sections to allow the frame to engage the fuel cell stack in a compressed state, removing the compression from the press, and using the frame to maintain the fuel cell stack in a compressed state.

14. The method of claim 11, wherein the side sections are formed of a resilient material and rigidly secured to the bottom section, further comprising pulling the frame side sections outwardly to allow the fuel cell stack in an uncompressed state to be placed in the frame, applying compression from a press to the fuel cell stack, releasing the frame side sections to allow the frame to engage the fuel cell stack in a compressed state, removing the compression from the press, and using the frame to maintain the fuel cell stack in a compressed state.

15. The method of claim 11, wherein the side sections are resiliently biased in an open position, further comprising placing an uncompressed fuel cell stack in the frame, applying compression from a press to the fuel cell stack, moving the side sections inwardly to enclose the fuel cell stack within the frame, removing the compression from the press, and using the frame to maintain the fuel cell stack in a compressed state.

16. The method of claim 11, wherein the side sections are biased in an open position, further comprising placing an uncompressed fuel cell stack in the frame, applying compression from a press to the fuel cell stack, bending the side sections inwardly to enclose the fuel cell stack within the frame, removing the compression from the press, and using the frame to maintain the fuel cell stack in a compressed state.

17. The method of claim 11, wherein the fastening includes engaging a hook integrally formed with the upper portions of the side sections into one or more corresponding structures in the upper portion of the fuel cell stack.

18. The method of claim 11, wherein the fastening includes attaching the upper portions of the side sections to the upper portions of the fuel cell stack with one or more fasteners.

19. The method of claim 18, wherein the attaching is performed using one or more screws.

20. The method of claim 18, wherein the attaching is performed using one or more locking pins.

21. A fuel cell system, comprising:

a stack of fuel cell plates;

seals positioned between adjacent plates in the stack; and a generally U-shaped frame adapted to hold the fuel cell plates and to apply a clamping force on the fuel cell plates and seals to improve performance of the seals.

22. The fuel cell system of claim 21, further comprising gas diffusion layers positioned between adjacent fuel cell plates, the gas diffusion layers adapted to be electrically contacted to portions of the fuel cell plates by application of the clamping force.

* * * * *